United States Patent [19]

Sember

[11] Patent Number: 5,012,172

[45] Date of Patent: Apr. 30, 1991

[54] CONTROL SYSTEM FOR SWITCHED RELUCTANCE MOTOR OPERATING AS A POWER GENERATOR

[75] Inventor: James W. Sember, Roanoke, Va.

[73] Assignee: General Electric Company, Salem, Va.

[21] Appl. No.: 351,491

[22] Filed: May 9, 1989

[51] Int. Cl.$^5$ .............................................. H02P 8/00
[52] U.S. Cl. .................................... 318/696; 318/685; 318/701
[58] Field of Search ................. 318/696, 685, 701

[56] References Cited

U.S. PATENT DOCUMENTS

| 4,682,093 | 7/1987 | Murphy et al. | 318/701 |
| 4,707,650 | 11/1987 | Bose | 318/685 |
| 4,739,240 | 4/1988 | MacMinn et al. | 318/696 |
| 4,769,993 | 9/1988 | Kawamura | 60/597 |
| 4,777,419 | 10/1988 | Obradoric | 318/696 |

FOREIGN PATENT DOCUMENTS

WO/88/029-51  4/1980  World Int. Prop. O.

OTHER PUBLICATIONS

J. T. Bass et al.; "Robust Torque Control of Switched-Reluctance Motors Without a Shaft-Position Sensor", Aug. 1986, pp. 212–216 (IEEE Transactions on Industrial Electronics).

J. T. Bass et al.; "Simplified Electronics for Torque Control of Sensorless Switched Reluctance Motor"; IEEE Transactions, vol. 1E-34, No. 2, May 1987, pp. 234–239 (reprinted as pp. 373–378).

Primary Examiner—William M. Shoop, Jr.
Assistant Examiner—Saul M. Bergmann
Attorney, Agent, or Firm—Arnold E. Renner

[57] ABSTRACT

A method for operating a multi-phase switched reluctance motor is a generator mode includes gating switches connected in series with selected ones of the phase windings of the motor into conduction to establish current flow in a selected one of the windings. The switches are thereafter disabled and current is forced to commutate into flyback diodes whereby the current is returned to an associated DC bus. The instant at which the conducting switches are gated out of conduction is selected or measured in angular displacement between an associated stator pole and a corresponding rotor pole by establishing a preselected magnitude of current such that when the current in the winding reaches that magnitude, the switches are disabled. The voltage at the DC bus is regulated during generator mode operation by adjusting the phase angle measured between a stator pole and a corresponding rotor pole at which the switches are gated into conduction. The voltage is alternatively regulated at the DC bus by adjusting the phase angle at which the switches are disabled if the generated current does not reach the preselected magnitude. Overcurrent protection is included to reduce the turn-on angle if the current in the DC bus exceeds another preselected magnitude.

8 Claims, 8 Drawing Sheets

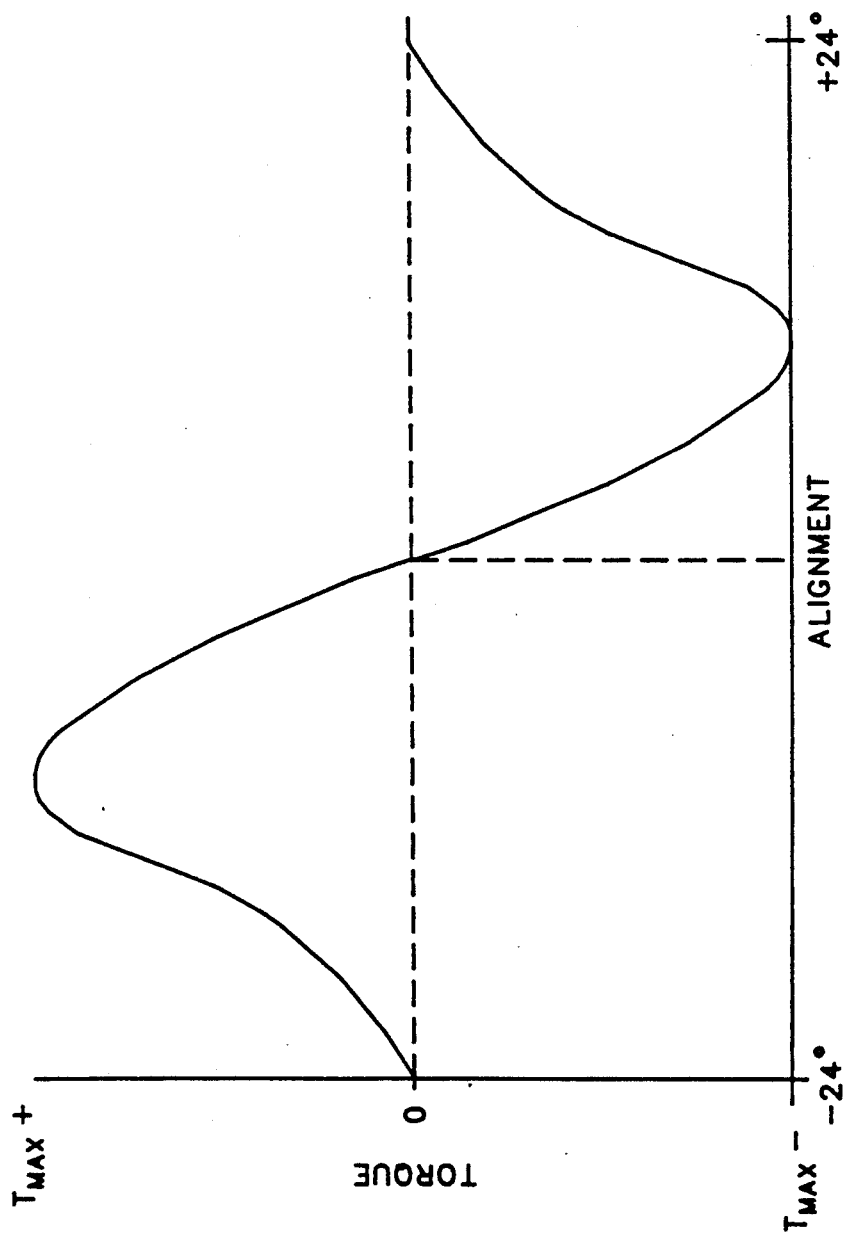

CONTROL SYSTEM FOR SWITCHED RELUCTANCE MOTOR OPERATING AS A POWER GENERATOR

This invention was made with Government support under prime contract DAAE07-84-C-R083 awarded by the Department of Defense. The Government has certain rights in this invention.

BACKGROUND OF THE INVENTION

This invention relates generally to motor controls and, more particularly, to a control system and method of control for a switched reluctance motor operating as a power generator.

Switched reluctance motors conventionally have multiple poles or teeth on both stator and rotor, i.e., they are doubly salient. There are phase windings on the stator but no windings on the rotor. Each pair of diametrically opposite stator poles is connected in series to form one phase of a multi-phase switched reluctance motor. Torque is produced by switching current into each of the phase windings in a predetermined sequence that is synchronized with the angular position of the rotor, so that a magnetic force of attraction results between the rotor and stator poles that are approaching each other. The current is switched off in each phase before the rotor poles nearest the stator poles of the phase rotate past the aligned position. Otherwise, the magnetic force of attraction would produce a negative or braking torque. The torque developed is independent of the direction of current flow so that unidirectional current pulses synchronized with rotor movement can be applied to develop torque in either direction. These pulses are generated by a converter using current switching elements such as thyristors or transistors.

In operation, each time a phase of the switched reluctance motor is switched on by closing a switch in a converter, current flows in the stator winding of that phase providing energy from a direct current (DC) supply to the motor. The energy drawn from the supply is converted partly into mechanical energy by causing the rotor to rotate toward a minimum reluctance configuration and partly in stored energy associated with the magnetic field. After the switch is opened, part of the stored magnetic energy is converted to mechanical output and part of the energy is returned to the DC source.

U.S. Pat. No. 4,707,650 describes a control system for a switched reluctance motor employing a programmable, closed loop, four quadrant control system incorporating feedback control, angle control and current control. The feedback control incorporates a speed feedback loop and/or a torque feedback loop. The angle control digitally synchronizes stator phase current pulses with rotor position, and the current control acts as a chopping or bang-bang controller to limit the magnitude of the stator phase current pulses. The magnitude and turn-on and turn-off angles of the stator current pulses for each phase, in feedback mode, are controlled so as to provide smooth operation and full torque and speed range with optimum performance in all four quadrants of motor operation, i.e., forward motoring, forward braking, reverse motoring and reverse braking.

The switched reluctance motor can be utilized as a generator in the braking mode. When operated as a generator, the motor produces current rather than voltage. Braking torque is produced when winding current continues to flow after a rotor pole has passed alignment with an associated stator pole. Because the switched reluctance motor has no rotor excitation, it is necessary to first draw electric power from a DC bus in order to cause current to begin flowing in windings of the motor. Current can be initiated in the windings either prior to alignment of a rotor pole and associated stator pole or after alignment has occurred. In general, very little torque will be produced by currents which exist when a corresponding rotor pole is adjacent or close to either side of a stator pole. Once the rotor pole passes alignment or continues into the negative torque region, the winding current will build faster than in the motoring region because the inductive term which establishes the voltage across the motor winding becomes negative. While some DC current will still be drawn from the associated DC bus while generating torque is being produced, DC current will be delivered to the bus when the switches actuated to start current into the winding are turned off and force the winding current to commutate into the associated flyback diodes. The net DC current is the sum of all the current from all of the phases of a multi-phase motor and it is this net DC current which is desired to be regulated when the reluctance motor is operated as a generator.

In some applications, a switched reluctance motor can be operated to function as a motor during start-up of a system and thereafter act as a generator after the system has become started. For example, if the reluctance motor is applied to act as a starter for a gas turbine engine, the motor may be called upon to bring the gas turbine engine up to its self-sustaining speed, and thereafter to act as a generator throughout the gas turbine's power producing speed range. The desired method of control in the generating mode is that of a voltage regulator since electrical loads can be supplied by the DC link voltage.

SUMMARY OF THE INVENTION

The present invention comprises a method for operating a multi-phase switched reluctance motor in a generator mode. The motor has a first plurality of stator poles wound with phase windings and a second plurality of salient rotor poles. The phase windings are connected by selectably controllable switches to a direct current bus with each phase winding including commutation means for conducting current when the switches are disabled. The inventive method comprises sequentially gating the switches for selected ones of the phase windings into conduction whereby current is caused to flow in the selected winding. The switches are thereafter disabled and current then flows through the commutation means back to the DC bus. In one form, the instant at which the switches are disabled, measured in angular displacement between an associated stator pole and a corresponding rotor pole, is determined by establishing a preselected magnitude of current such tat when the current in the winding reaches that magnitude, the switches are disabled. The method further includes regulating the voltage at the DC bus during generator mode of operation by adjusting the stator pole to rotor pole phase angle at which the switches are gated into conduction. Additionally, the voltage can be regulated at the DC bus by adjusting the stator pole to rotor pole angle at which the switches are disabled if generated current does not reach the preselected magnitude. The inventive system also includes an overcurrent protection system which reduces the stator pole to rotor pole turn-on angle if the current in the DC bus exceeds another predetermined magnitude.

BRIEF DESCRIPTION OF THE DRAWINGS

The foregoing and other objects, features and advantages of the present invention will be apparent from the following detailed description of the invention when read in conjunction with the accompanying drawings in which:

FIG. 2 is a graph illustrating torque produced for a single phase of the motor of FIG. 1 with constant DC current in the phase;

DETAILED DESCRIPTION OF THE INVENTION

Figure 1A:
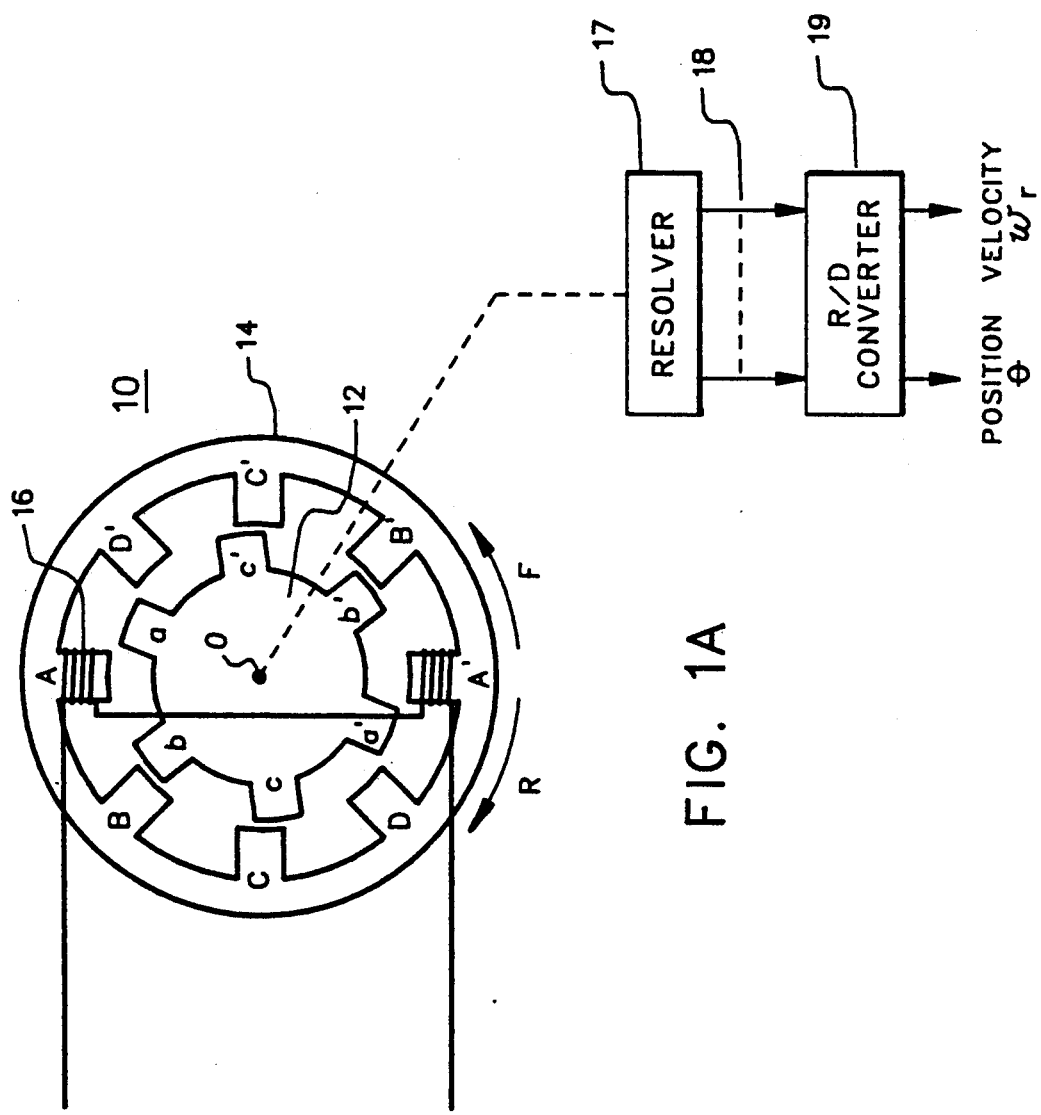
FIG. 1A is a schematic representation of a typical switched reluctance motor and includes means to provide rotor position and motor velocity signals.

FIG. 1A illustrates a typical switched reluctance motor 10 including a rotor 12 rotatable in either a forward or a reverse direction within a stator 14. The forward direction F indicates counterclockwise rotation of the rotor while the reverse direction R indicates clockwise rotation. Rotor 12 has three pairs of diametrically opposite poles labeled a-a', b-b' and c-c'. Stator 14 is provided with four pairs of diametrically opposite stator poles labeled A-A', B-B', C-C' and D-D'. For purpose of discussion, the illustrated embodiment is assumed to be constructed such that each rotor pole and each stator pole has an angular extent of 18°. The gap between adjacent rotor poles in this embodiment is 42° while the gap between adjacent stator poles is 27°. These angles are measured with respect to center point O.

The opposite poles of each stator pole pair share a common winding and define a respective stator phase. A representative winding coil 16 for phase A is illustrated in FIG. 1A. Similar windings are provided for each of the other stator pole pairs. Also depicted in FIG. 1A are means to provide signals representing rotor position ($\theta$) and motor velocity ($\omega_r$). A resolver 17 is connected, as depicted by the dashed line, to rotor 12 and provides output signals via lines 18 to a resolver to digital (R/D) converter 19. The outputs of the converter 19 are the position signal $\theta$ and the velocity signal $\omega_r$.

Rotor rotation is produced by switching current on and off in each stator phase winding in a predetermined sequence synchronized with angular position of the rotor, i.e., at selected turn-on and turn-off angles. These angles are angularly displaced between an associated stator pole and a corresponding rotor pole and may be an advance angle, i.e., an angle before the rotor pole aligns with the stator pole, or a retard angle, i.e., an angle between the stator pole and rotor pole after alignment has been passed. Current in each stator phase is derived from power converter 20 of FIG. 1B, which impresses a DC bus voltage $V_d$ across the four parallel stator phase legs PH-A, PH-B, PH-C and PH-D. Bus voltage $V_d$ can be obtained from a battery (not shown), or from an AC power supply, e.g., three phase, 220 volt, 60 Hertz line, through a conventional diode rectifier circuit 22 and filtering capacitor 23.

Figure 1B:
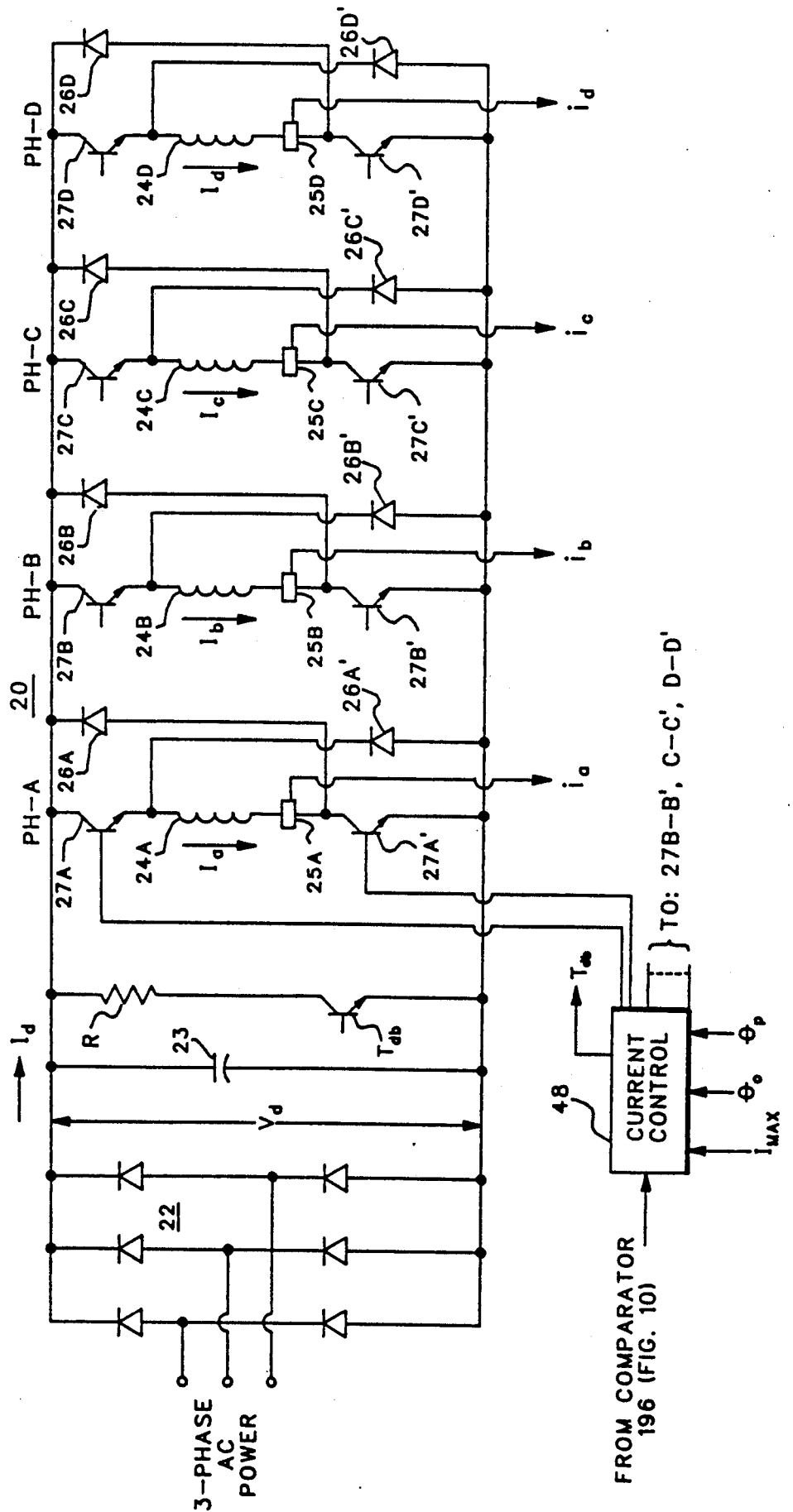
FIG. 1B illustrates a typical power converter for the switched reluctance motor of FIG. 1A.

The converter circuitry for each stator phase leg is identical. The PH-A leg, for example, includes a stator winding 24A, first and second flyback diodes 26A and 26A' and first and second current switching devices such as transistors 27A and 27A' interconnected as shown in FIG. 1B. A base of each of the transistors is connected to an output of a current control 48 which control serves to govern the conductive state of the various transistors 27A, 27A', 27B, 27B', etc. Current control 48 responds, variously, to input signals representing the maximum desired current limit ($I_{max}$) of a phase current, for example, $I_a$, a turn-on angle signal ($\theta_O$), a turn-off angle signal ($\theta_p$), and the output signal from a comparator 196 all of which will be described hereinafter, particularly with respect to FIG. 10.

When transistors 27A and 27A' are switched on, a phase current $I_a$, derived from link current $I_d$ flows through the stator winding for phase A. When the transistors 27A and 27A' are switched off, current in the winding 24A decays by re-circulating to the source or to the filter capacitor 23 through the flyback diodes 26A and 26A'. This recirculating current can be absorbed by a load resistor R connected in series with a controllable switch $T_{db}$ across the rectified AC source. In other applications, the recirculatory current could be coupled to a rechargeable battery. The converter circuitry for each of the other phase legs operates identically and accordingly is not detailed herein. The transistors coupled in series with each of the phase windings are made to conduct in sequence, with the order of conduction depending upon the direction of rotation.

A signal, $i_a$, representative of the phase current, $I_a$, is generated by any suitable means, 25A, such as a shunt or a current transducer such as that produced by Liaisons Eleotroniques Mechaniques S.A. of Geneva, Switzerland. Signals $i_b$, $i_c$ and $i_d$ are similarly developed.

The switched reluctance motor can operate in both a motoring mode and in a generating mode. Referring briefly to FIG. 2, there is shown a graph of the torque produced for a single phase of the motor of FIG. 1 with constant DC current in the phase. Motoring or positive torque, as illustrated in FIG. 2, is produced in the region prior to the alignment of the rotor pole pair with an associated stator pole pair, and generating or negative torque is produced in the region after alignment. No torque is produced when the rotor pole pair is exactly aligned with the stator pole pair. It can be seen from this figure that for motoring torque production, it is desirable to turn on a phase in the rotor angle region between −24° and alignment and to maintain current in that phase until or just before alignment. In the generating mode, the transistor pair which connects the phase winding across the voltage source can be gated into conduction either just before alignment or after the rotor pole pair passes alignment with the stator pole pair so that current is built up in the phase winding. When the transistor is gated out of conduction, current commutates into the associated diodes and is returned to the DC bus.

Figure 3:
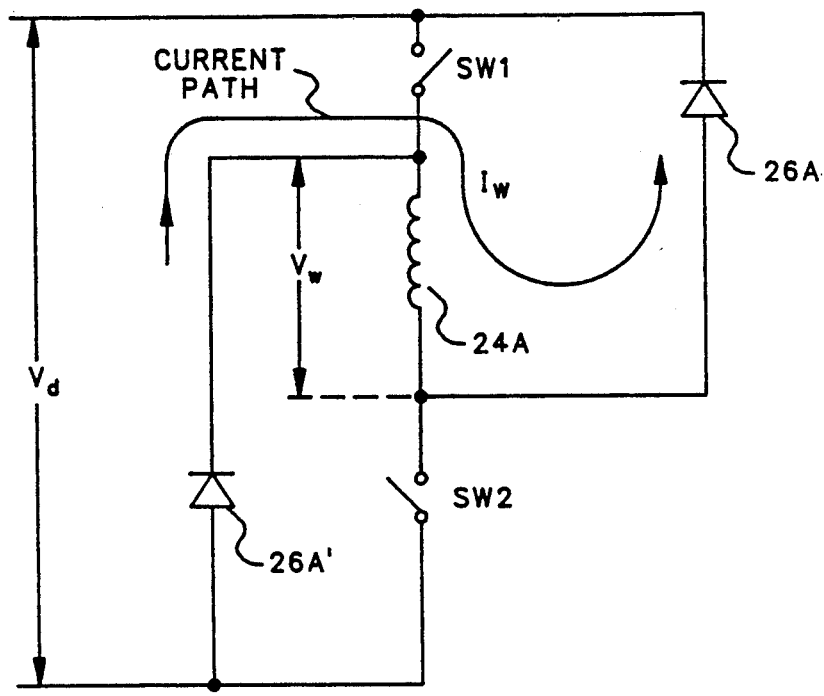
FIG. 3 is a simplified schematic representation of one phase of a switched reluctance motor illustrating current flow during generator mode of operation.
Figure 5:
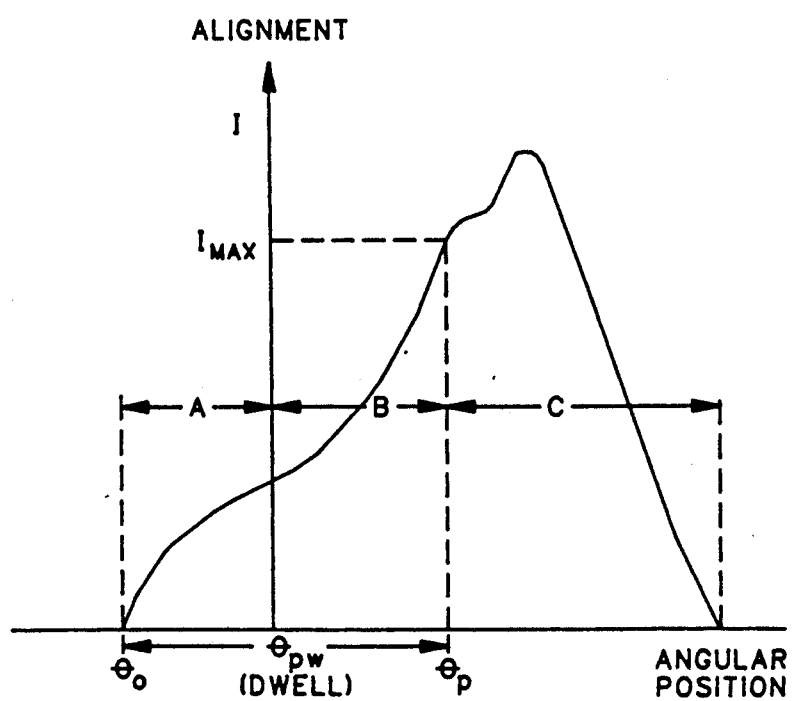
FIG. 5 illustrates a winding current waveform for a switched reluctance motor operating as a current generator.
Figure 4:
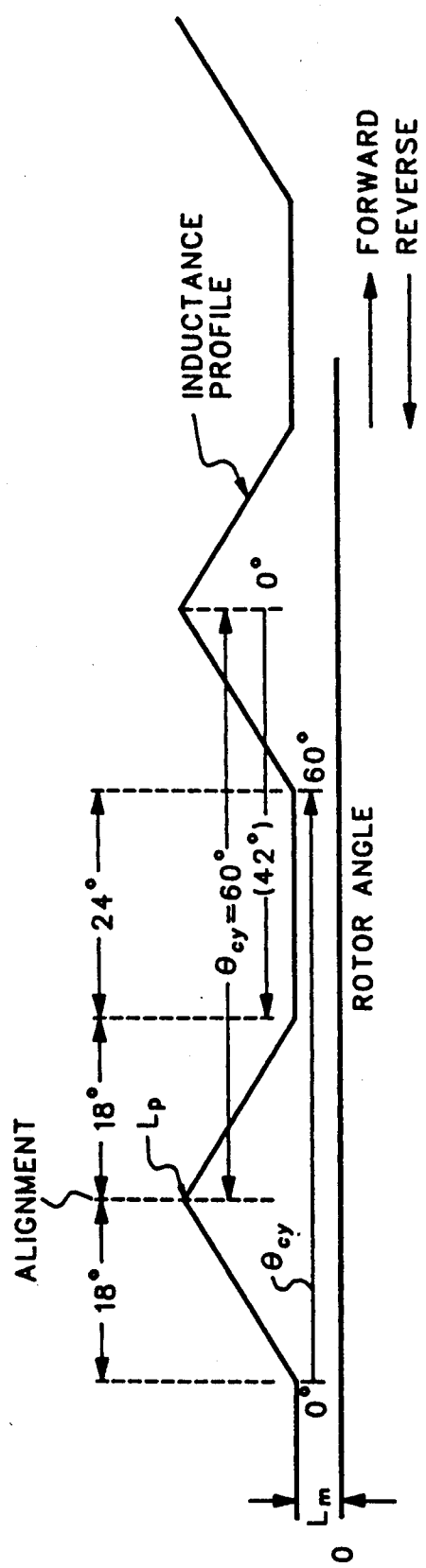
FIG. 4 profiles inductance with respect to rotor angular position for a stator pole pair of the motor of FIG. 1A.

The switched reluctance motor produces current, when operating in a generating mode, rather than voltage. Referring to FIG. 3, there is shown one phase of the multi-phase switched reluctance motor of FIG. 1A and the selected power circuit configuration of 1B. One aspect of the power circuit configuration is that it is capable of returning power to the DC bus. This allows generation of usable electric power. When the switches SW1 and SW2 (corresponding to transistors 27A, 27A') are opened, current continues to flow in winding 24A but since the winding is now connected to the DC bus through diodes 26A, 26A' the bus current is now in a direction to return power to the source. As mentioned above, negative or braking torque is produced when the winding current is flowing in the region after the rotor pole has passed alignment with an associated stator pole. This braking torque will generate electrical power, but because the switched reluctance motor has no rotor excitation, it is necessary to first draw electric power from the DC bus in order to establish current in the winding. This requires that there be provided some energy storage medium on the DC bus such as, for example, the capacitor 23 shown in FIG. 1B. The voltage across the motor winding $V_w$ is given by the following equation:

$$V_w = I_w \frac{dL}{dt} + L \frac{dI_w}{dt} + I_w R$$

where L is winding inductance and R is the winding resistance and $I_w$ is the winding current. The winding inductance is not constant but varies with position of a rotor pole with respect to a stator pole. A typical inductance profile is shown in FIG. 4. FIG. 5 shows a typical winding current waveform for a switched reluctance motor operating as a current generator. The phase current begins from zero at turn-on angle $\theta_O$ both of the transistors such as, for example, transistors 27A and 27A' are gated into conduction. In the general case such conduction may be started in the motoring region shown as region A in FIG. 5. Winding current builds up in this region while drawing DC current from the bus because the bus voltage $V_d$ is greater than the sum of $$I_w \frac{dL}{dt} + L \frac{dI_w}{dt}.$$

It will be noted that both of these terms are positive in the motoring region or region A. However, since the current is very low and the rotor position is close to alignment, very little motoring torque will be produced. Once the rotor passes alignment and enters into the negative torque area indicated as region B, the winding current builds faster than in the motoring region because dL/dt term becomes negative. In this region, DC current is still being drawn from the although braking torque is being produced. Beginning at the turn-off angle $\theta_p$, DC current is finally delivered to the bus when, in the region indicated as C, both of the transistor switches are turned off, allowing the winding current to commutate into the diodes 26A and 26A' (FIG. 1B). In region C, current may continue to increase for some time, but eventually peaks and then decays. The net DC current is the sum of all currents from all of the phases of the multi-phase motor and it is this net DC current which is desired to be regulated and will sustain the voltage on the DC bus, which voltage can also be regulated.

The basic control parameters of the switched reluctance motor drive system can be summarized as follows:

$I_{MAX}$ is the chopping current level:
$\theta_O$ is the transistor turn-on angle;
$\theta_p$ is the transistor turn-off angle; and
$\theta_{pw}$ is the difference between $\theta_O$ and $\theta_p$.

As earlier indicated, a switched reluctance motor can be operated as a motor during start-up of a system and thereafter as a generator when the system is running. FIG. 1B illustrates a circuit diagram of a multi-phase switched reluctance motor connected in circuit with a power conditioner 22. In a generating mode, a battery may be placed in parallel with a load resistance in parallel with capacitor 23. This will allow the battery or the load resistance to absorb generated energy from the reluctance motor. One consideration in the application of the switched reluctance motor as a generator is that the DC bus voltage, across the battery or parallel resistance, must be controlled for varying loads and motor speeds.

Figure 6:
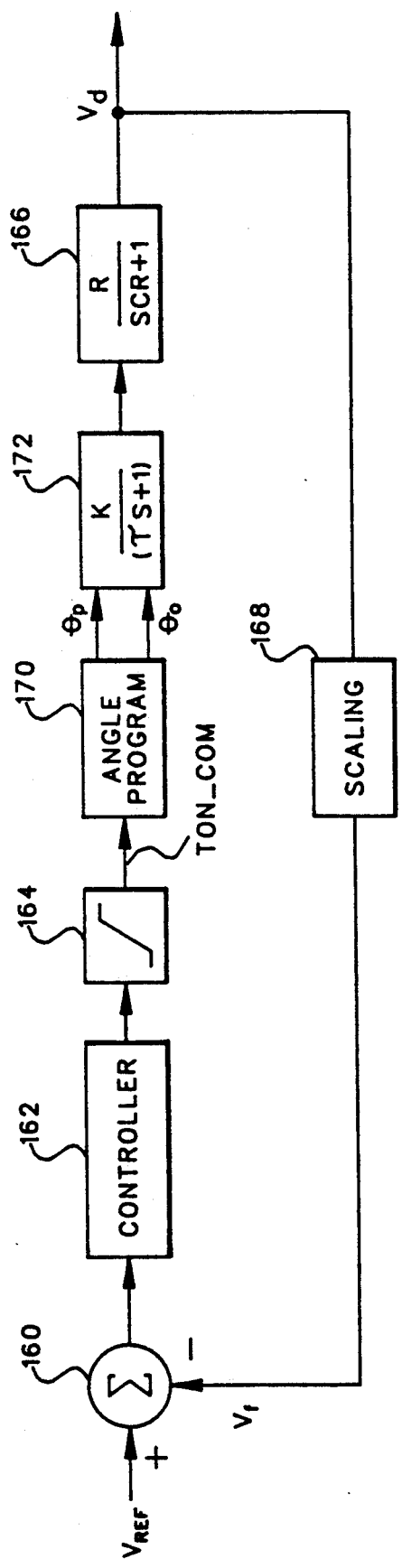
FIG. 6 is a simplified block diagram illustrating a basic DC bus voltage regulator in accordance with one form of the present invention.

Referring now to FIG. 6, there is shown an illustration of a basic DC bus voltage regulator in accordance with one form of the present invention. A voltage feedback signal $V_f$ is subtracted from a voltage reference signal $V_{ref}$ in summing junction 160. The resultant error signal is fed into a controller 162. The controller 162 is preferably an integral plus proportional controller of a type well known in the art. The controller 162 may include output clamps 164 and may be implemented in either hardware or software. The load applied to the switched reluctance motor is modeled by a parallel RC circuit 166. The circuit 166 may represent the DC link capacitor 23 (FIG. 1B) and any load resistance connected in parallel with capacitor 23. The output of the circuit 166 is the DC link voltage $V_d$ which, to close the control loop, may be passed through a voltage scaling circuit 168 before application to the summing junction 160 as the signal $V_f$. The motor and power converter are modeled as a low-pass filter 172. The elements thus far recited in FIG. 6 are common elements in a proportional plus integral feedback control loop. Applicant's invention resides primarily in the angle program block 170 which assures that the firing angles or turn-on and turn-off angles that are provided to the power switching circuit for the switched reluctance motor result in a linearized gain.

Figure 7:
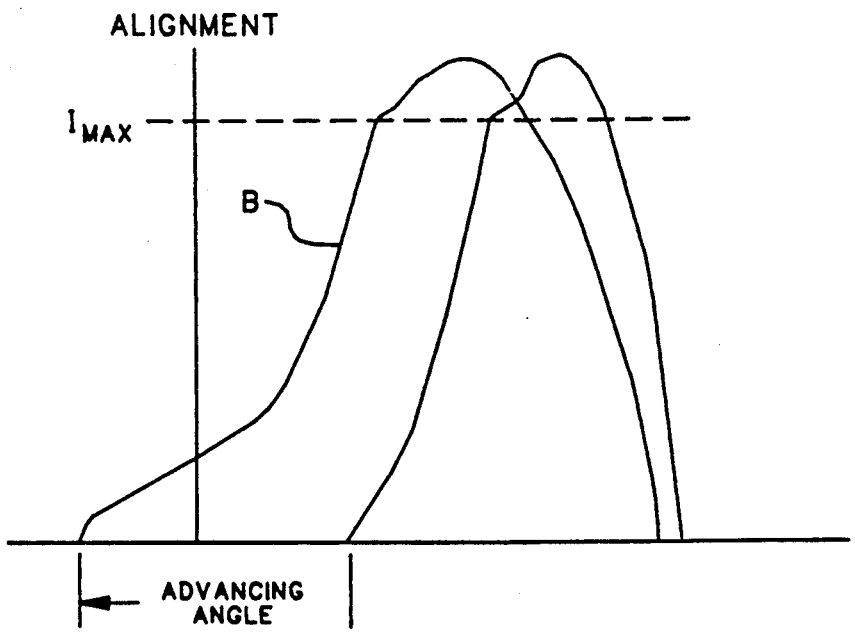
FIG. 7 is a graph illustrating the effects of advancing a turn-on angle with constant current and turn-off level in a switched reluctance motor operating as a generator.

It has been determined that a linearized DC link current, which is essentially independent of motor velocity, can be obtained by establishing a constant current turn-off level $I_{MAX}$. (See FIG. 7.) Referring briefly to FIG. 1B, current is turned on by gating transistors 27A, 27A' into conduction and allowing current to build until it reaches the turn-off level, whereupon both transistors are gated out of conduction and the current commutates into diodes 26A, 26A'. Advancing the turn-on angle as shown by waveform B of FIG. 7 produces a larger phase current pulse, which produces more DC bus current. The amount of DC bus current produced has been found to be linear with advancing turn-on angle. Of course there are limitations, since advancing too far will start the current too far into the motoring region and produce decreasing amounts of generated current. Also, retarding the turn-on angle too far will produce net motoring torque, since current will be flowing during the approaching alignment of the next rotor pole. The practical limits for the range of the turn-on angle can be determined by empirical methods for a particular application.

Controlling the DC current as described above yields a very linear transfer function of DC current versus turn-on angle over large variations in DC current and motor speed. System efficiencies remain good for high DC current levels; however, the efficiency falls off quickly at lower DC current levels. This can be expected since the method keeps the winding current at high levels even for low DC bus currents.

Figure 8:
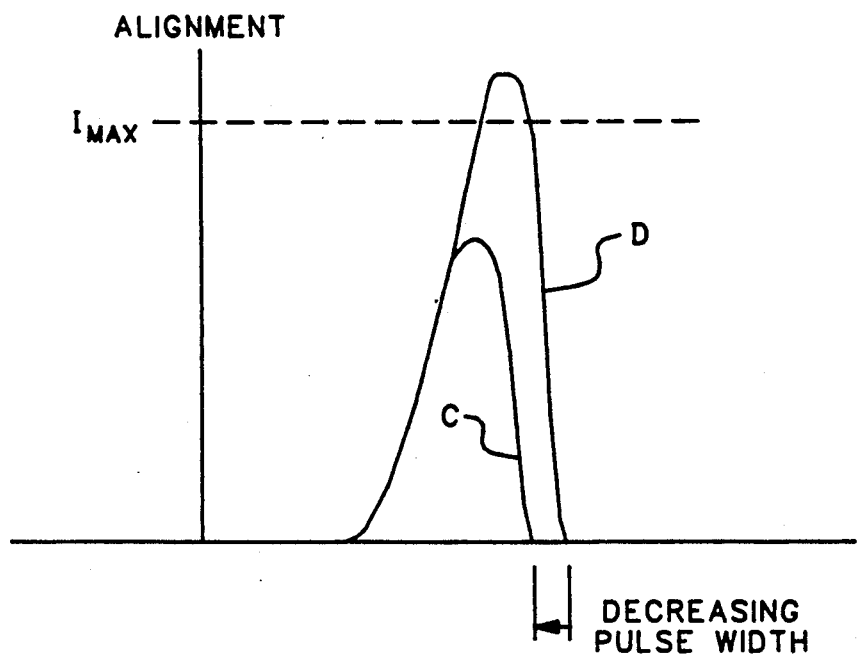
FIG. 8 illustrates the effect of decreasing pulse width with a constant turn-on angle in a switched reluctance motor operating as a current generator.

In order to maintain high system efficiency for lower DC current levels, it is necessary to introduce another mode of control, illustrated by FIG. 8. In this additional mode, the turn-on angle is held fixed, while the pulse width is decreased. Note, for example, the reduced width of current pulse C with respect to current pulse D. This type of "dual-mode" control lends itself particularly well to a digital microprocessor-based implementation, although analog control could be employed as well. The output of the regulator clamp block 164 of FIG. 6 can be considered to be a turn-on angle command TON_COM, which is fed into the angle program block 170. The angle program block 170 calculates a TURN_ON_BREAK and for TON_COM greater than TURN_ON_BREAK the actual turn-on angle is TON_COM directly and the control operates in the mode illustrated in FIG. 7, i.e., a constant current turn-off level with advancing turn-on angle. For TON_COM less than TURN_ON_BREAK, the actual turn-on angle is maintained at TURN_ON_BREAK and the control operates as shown in FIG. 8, i.e., decreasing pulse width but a constant turn-on angle.

In the preferred embodiment, TURN_ON_BREAK is a function of motor velocity ($\omega_r$), given by the equation:

$$TURN\_ON\_BREAK = G1(\omega_r - G2)^2 - G3$$

where G1, G2 and G3 are constants selected for a particular motor by empirical curve fitting from graphs of system efficiency and DC link current ($I_d$) as functions of turn-on angle and motor velocity at constant turn-off current. The TURN_ON_BREAK function was found to maintain high system efficiencies over the generating operating speed range. A pulse width, or DWELL, is also calculated in block 170. Pulse width is also a function of $\omega_r$ and is determined in the following two step method. First, a DWELL_BREAK or end of pulse is obtained from:

$$DWELL\_BREAK = G4(\omega_r) + G5$$

where G4 and G5 are constants selected for the particular motor by empirical curve fitting. Finally, using the quantities TURN_ON_BREAK and DWELL_BREAK, the DWELL is calculated as a function of TURN_ON_BREAK in accordance with the relationship:

$$DWELL = DWELL\_BREAK - G6(TURN\_ON\_BREAK - TON\_COM)$$

While these equations illustrate a preferred embodiment, other equations may be employed for differing applications.

Figure 9:
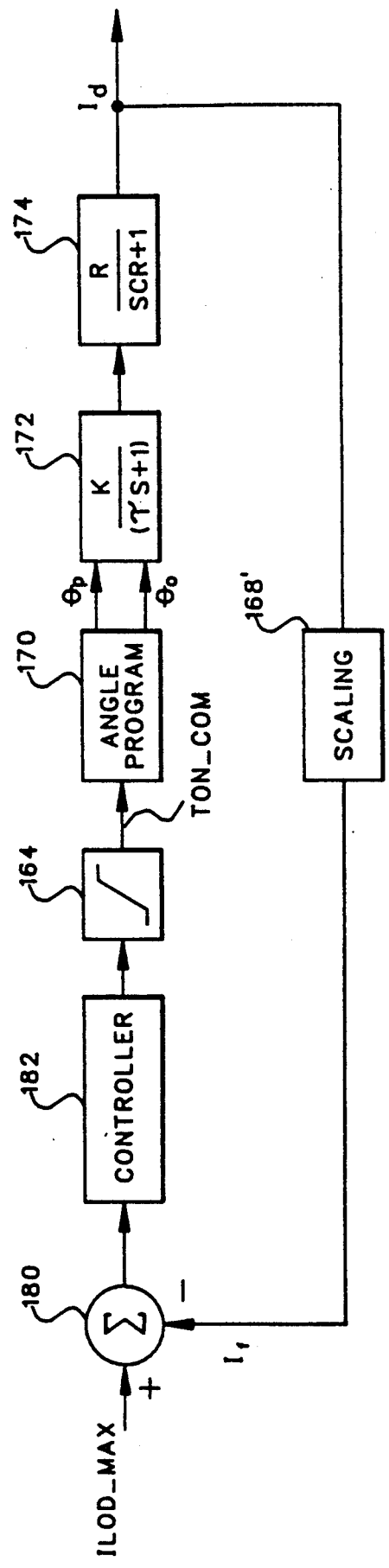
FIG. 9 is a simplified block diagram of an overcurrent regulator in accordance with one aspect of the present invention.
Figure 10:
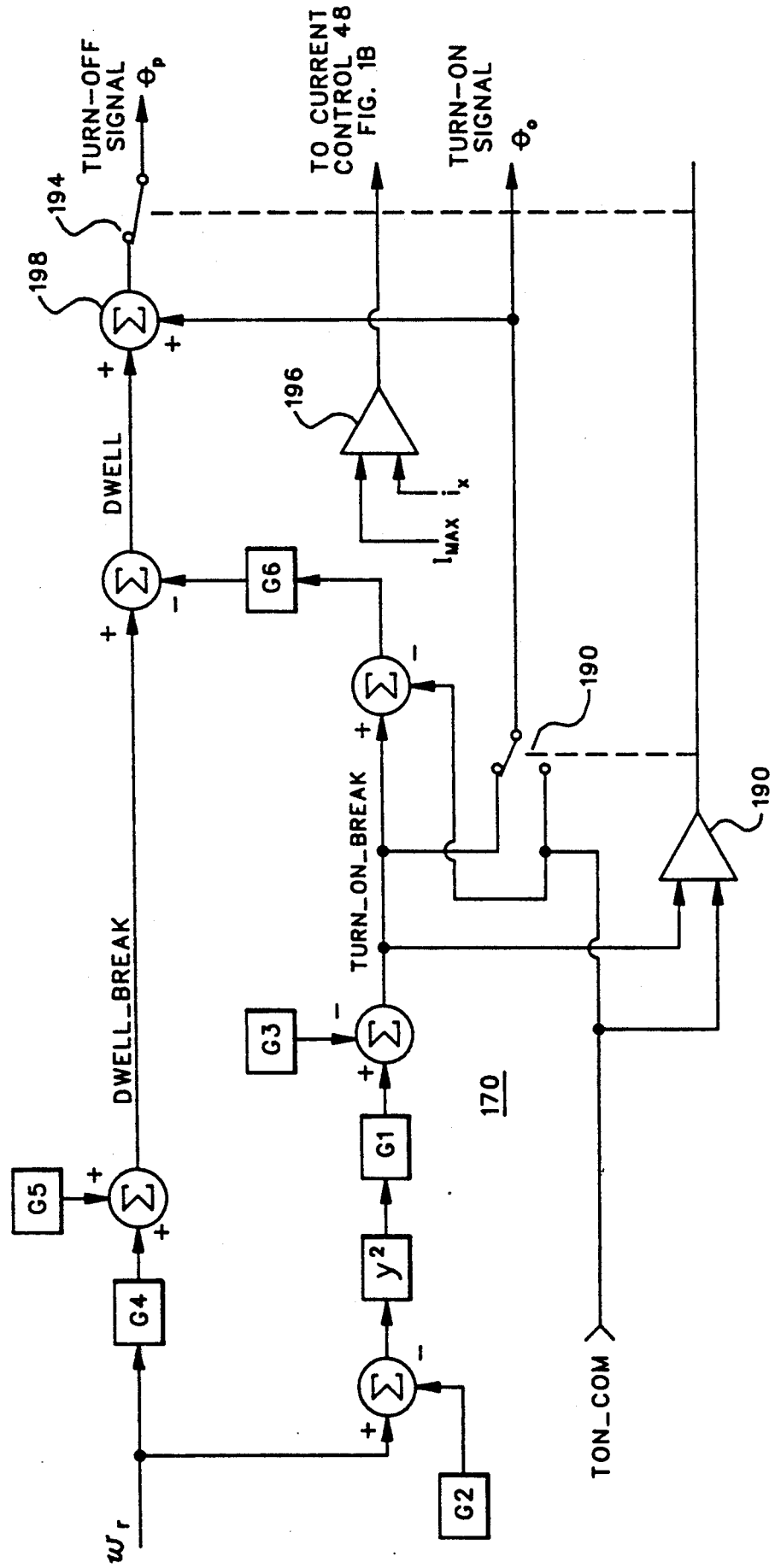
FIG. 10 is a schematic representation of the angle program block 170 of the present invention, of FIGS. 6 and 9.

FIG. 10 is a schematic representation of the angle program (block 170) of FIGS. 6 and 9. The depiction developing the signals DWELL and TURN_ON_BREAK is a direct one-for-one implementation of the above two equations for those terms and needs no further explanation. The generation of the turnoff signal ($\theta_p$) and the turn-on signal ($\theta_O$) from the DWELL and TURN_ON_BREAK signals is as follows. The TURN_ON_BREAK signal is compared in a comparator 190 with the signal TON_COM. When the latter exceeds the former, the output of comparator 190 causes the switches 192 and 194 to be in the lower position (opposite to that illustrated) and hence $\theta_O$ is equal to TON_COM and $\theta_p$ is not directly controlled. In this situation, the turn-off function of current control 48 (FIG. 1B) is the result of the output of a comparator 196. Comparator 196 has, as its inputs the $I_{MAX}$ reference signal and a one ($i_x$) of the phase current signals $i_a$, $i_b$, $i_c$ or $i_d$. (See FIG. 1B.) The output of comparator 196 in this instance serves in the stead of the $\theta_p$ signal and is present when $i_x$ exceeds $I_{MAX}$. (In actuality, there exists a comparator corresponding to 196 for each phase of the stator.)

When the TURN_ON_BREAK signal exceeds the TON_COM signal, the output of comparator 190 causes the switches 192 and 194 to be in the position indicated. In this situation, the DWELL signal is summed with the TURN₁₃ ON_BREAK signal (summer 198) to yield the turn-off signal $\theta_p$. The turn-on signal is now equal to the TURN_ON_BREAK signal.

Another element of the generating control for the switched reluctance motor is overcurrent protection. Such protection can be implemented using an overcurrent takeover regulator as in FIG. 9. The reference ILOD_MAX for this regulator, can be either a constant or a function of speed and/or time. DC load current is sensed and subtracted from ILOD_MAX at summing point 180. If the load current exceeds LOD_MAX, the overcurrent regulator takes over from the voltage regulator and reduces TON_COM which reduces the load current by allowing the DC link voltage to fall. The controller 182 can be of any common type, such as the proportional plus integral type described in FIG. 6. The integral function aids in compensating for any remaining variations in the linearity of the power bridge and motor simulation block 172. The clamp block 164, angle program 170 and power bridge and motor block 172 can be identical to the corresponding blocks in FIG. 6. Block 174 again represents the DC link capacitor and load resistance, which differs from FIG. 6 block 166 because current is now the desired output quantity.

Once the overcurrent takeover regulator has taken control of the firing angle, it regulates current at ILOD_MAX. It can release control after the overcurrent load is removed and the voltage rises to some incremental value above the reference level to provide some hysteresis. While a particular switching arrangement has not been shown for transitioning from a voltage control to a current control for overcurrent protection, such implementation will be immediately apparent from the above description.

While the invention has been described in what is presently considered to be a preferred embodiment, it will be appreciated that other modifications and variations of the invention can be made without departing from the spirit and scope of the invention. Accordingly, it is intended that the invention not be limited to the disclosed embodiment but be interpreted within the full spirit and scope of the appended claims.

What is claimed is:

1. A method for operating a multi-phase switched reluctance motor in a generator mode, the motor having a first plurality of stator poles wound with phase windings and a second plurality of salient rotor poles, the phase windings being connected by selectably controllable switches to a direct current (DC) bus and with each phase winding including commutation means for conducting current when the switches are disabled, the method comprising the steps of:

gating the switches for a selected phase winding into conduction whereby current is caused to flow in the winding and in said DC bus in a first direction;

disabling the switches when winding current reaches a preselected magnitude whereby current in the winding is directed, by way of said commutation means, to the DC bus to effect current flow in said bus in a direction opposite to said first direction; and regulating the voltage at the DC bus, when said motor is operating in the generator mode, by varying the instant at which the switches are gated into conduction as a function of the angular displacement between the associated stator pole and a corresponding rotor pole.

2. A method for operating a multi-phase switched reluctance motor in a generator mode, the motor having a first plurality of stator poles wound with phase windings and a second plurality of salient rotor poles, the phase windings being connected by selectably controllable switches to a direct current (DC) bus and with each phase winding including commutation means for conducting current when the switches are disabled, the method comprising the steps of:

gating the switches for a selected phase winding into conduction whereby current is caused to flow in the winding and in said DC bus in a first direction;

disabling the switches when winding current reaches a preselected magnitude whereby current in the winding is directed, by way of said commutation means, to the DC bus to effect current flow in said bus in a direction opposite to said first direction; and regulating the voltage at the DC bus, when said motor is operating in the generator mode, by varying the instant at which the switches are disabled when a current in one of the phase windings exceeds a preselected magnitude.

3. A method for operating a multi-phase switched reluctance motor in a generator mode, the motor having a first plurality of stator poles wound with phase windings and a second plurality of salient rotor poles, the phase windings being connected by selectably controllable switches to a direct current (DC) bus and with each phase winding including commutation means for conducting current when the switches are disabled, the method comprising the steps of:

gating the switches for a selected phase winding into conduction whereby current is caused to flow in the winding and in said DC bus in a first direction;

disabling the switches when winding current reaches a preselected magnitude whereby current in the winding is directed, by way of said commutation means, to the DC bus to effect current flow in said bus in a direction opposite to said first direction; and regulating the current in the DC bus, when said motor is operating in the generator mode, by varying the instant the switches are gated into conduction as a function of the angular displacement between the associated stator pole and a corresponding rotor pole.

4. A method for operating a multi-phase switched reluctance motor in a generator mode, the motor having a first plurality of stator poles wound with phase windings and a second plurality of salient rotor poles, the phase windings being connected by selectably controllable switches to a direct current (DC) bus and with each phase winding including commutation means for conducting current when the switches are disabled, the method comprising the steps of:

gating the switches for a selected phase winding into conduction whereby current is caused to flow in the winding and in said DC bus in a first direction;

disabling the switches when winding current reaches a preselected magnitude whereby current in the winding is directed, by way of said commutation means, to the DC bus to effect current flow in said bus in a direction opposite to said first direction; and regulating the current in the DC bus, when said motor is operating in the generator mode, by varying the instant at which the switches are disabled when a current in a one of the phase windings exceeds a preselected magnitude.

5. A method for operating a multi-phase switched reluctance motor in a generator mode, the motor having a first plurality of stator poles wound with phase windings and a second plurality of salient rotor poles, the phase windings being connected by selectably controllable switches to a direct current (DC) bus and with each phase winding including commutation means for conducting current when the switches are disabled, the method comprising the steps of:

gating the switches for a selected phase winding into conduction prior to alignment of the associated stator pole with a rotor pole whereby current is caused to flow in the winding and in said DC bus in a first direction; and disabling the switches when winding current reaches a preselected magnitude whereby current in the winding is directed, by way of said commutation means, to the DC bus to effect current flow in said bus in a direction opposite to said first direction.

6. A method for operating a multi-phase switched reluctance motor in a generator mode, the motor having a first plurality of stator poles wound with phase windings and a second plurality of salient rotor poles, the phase windings being connected by selectably controllable switches to a direct current (DC) bus and with each phase winding including commutation means for conducting current when the switches are disabled, the method comprising the steps of:

gating the switches for a selected phase winding into conduction whereby current is caused to flow in the winding and in said DC bus in a first direction;

disabling the switches when winding current reaches a preselected magnitude whereby current in the winding is directed, by way of said commutation means, to the DC bus to effect current flow in said bus in a direction opposite to said first direction; and regulating the voltage at the DC bus, when said motor is operating in the generator mode, by varying the instant at which the switches are disabled when the switches were gated into conduction at an instant when the angular displacement between as associated stator pole and a corresponding rotor pole was equal to a preselected angular displacement.

7. A method for operating a multi-phase switched reluctance motor in a generator mode, the motor having a first plurality of stator poles wound with phase windings and a second plurality of salient rotor poles, the phase windings being connected by selectably controllable switches to a direct current (DC) bus and with each phase winding including commutation means for conducting current when the switches are disabled, the method comprising the steps of:

gating the switches for a selected phase winding into conduction whereby current is caused to flow in the winding and in said DC bus in a first direction;

disabling the switches when winding current reaches a preselected magnitude whereby current in the winding is directed, by way of said commutation means, to the DC bus to effect current flow in said bus in a direction opposite to said first direction; and regulating the current in the DC bus, when said motor is operating in the generator mode, by varying the instant at which the switches are disabled when the switches were gated into conduction at an instant when the angular displacement between an associated stator pole and a corresponding rotor pole was equal to a preselected angular displacement.

8. A method for operating a multi-phase switched reluctance motor in a generator mode, the motor having a first plurality of stator poles wound with phase windings and a second plurality of salient rotor poles, the phase windings being connected by selectably controllable switches to a direct current (DC) bus and with each phase winding including commutation means for conducting current when the switches are disabled, the method comprising the steps of:

gating the switches for a selected phase winding into conduction whereby current is caused to flow in the winding and in said DC bus in a first direction; and, disabling the switches when winding current reaches a preselected magnitude whereby current in the winding is directed, by way of said commutation means, to the DC bus to effect current flow in said bus in a direction opposite to said first direction, said preselected magnitude of winding current being selected to establish a predetermined DC bus voltage; and further including the steps of:

determining when the preselected magnitude of winding current necessary to maintain the predetermined bus voltage exceeds an overload current value; and thereafter regulating current at the overload value by disabling the switches in response to current in the DC bus.

* * * * *